(12) United States Patent
Wollak et al.

(10) Patent No.: US 6,572,979 B1
(45) Date of Patent: Jun. 3, 2003

(54) THERMOPLASTIC FILM FOR PACKAGING

(75) Inventors: Herbert Franz Wollak, Plan-les-Ouates (CH); Bernard Rioux, Paris (FR)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/622,758

(22) PCT Filed: Feb. 25, 1999

(86) PCT No.: PCT/US99/04046

§ 371 (c)(1), (2), (4) Date: Aug. 21, 2000

(87) PCT Pub. No.: WO99/43498

PCT Pub. Date: Sep. 2, 1999

(30) Foreign Application Priority Data

Feb. 26, 1998 (EP) ............................................. 98200607

(51) Int. Cl.$^7$ ............................................. B32B 27/32
(52) U.S. Cl. ........................ 428/516; 428/520; 428/910
(58) Field of Search ................................ 428/516, 520, 428/910

(56) References Cited

U.S. PATENT DOCUMENTS

| 4,098,406 | A | 7/1978 | Otten et al. |
| 5,630,307 | A | 5/1997 | Cathala ........................ 53/398 |
| 6,268,044 | B1 * | 7/2001 | Grangette ................... 428/213 |

FOREIGN PATENT DOCUMENTS

| DE | 19521244 | 12/1995 |
| EP | 0 537 080 | 4/1993 |
| GB | 2 290 500 | 1/1996 |

* cited by examiner

Primary Examiner—D. Lawrence Tarazano

(57) ABSTRACT

A thermoplastic shrinkable film consisting of two or more layers, including, at least, (a) a layer of a polyolefin, (b) a layer of a blend of a polyolefin and an ionomer is disclosed. Optionally, the film contains (c) a further layer of a polyolefin, in which case layer (b) is positioned between layers (a) and (c). Films according to this invention demonstrate omnidirectional tearability, good clarity and strength and are cost competitive with other films on the market.

4 Claims, No Drawings

THERMOPLASTIC FILM FOR PACKAGING

BACKGROUND OF THE INVENTION

The present invention relates to thermoplastic, shrinkable film intended for packaging purposes, more particularly for bundling unit packs of individual objects, such as tinned goods, cans, bottles or the like. This film is particularly suitable for packaging PET bottles.

Bundling is a method which consists of surrounding all of the objects to be packaged with a shrinkable thermoplastic resin film which can be welded back onto itself, so as to form a sleeve around the objects. The package is then shrunk by, for example, passing it through an oven at a temperature that enables the thermoplastic resin constituting the film to soften, thereby relieving internal stresses. Upon leaving the oven, rapid cooling ensures that the film closes tightly around the objects contained therein. This yields a bundle in which the thermoplastic film performs the function of a skin in close contact with the surface of the packaged objects.

Various thermoplastic shrinkable packaging films are known. Representative are those described in EP 0 537 080 B1, GB 2 290 500 A and U.S. Pat. No. 5,630,307. EP 0 537 080 B1 describes a film having at least two layers, one being a polyolefin, the other being an ionomer, which is blow co-extruded under particular conditions such that the film has a tear preference perpendicular to the direction of extrusion of the film.

GB 2 290 500 A discloses films based upon a substrate of polyolefin and ionomer. One such film is a three-layer film having a central layer of ionomer and two outer layers of polyethylene. A second film mentioned is a monolayer of a blend of polyethylene and ionomer. U.S. Pat. No. 5,630,307, as well, discloses monolayer films made from blends of ionomer and polyethylene.

Although the films described in these documents function well in many circumstances, each has certain drawbacks. The monolayer films tend to have poor clarity and lack strength needed for bundling heavier objects. The multilayer film described in GB 2 290 500 requires, in practice, a relatively thin layer of ionomer, which is difficult to produce on standard industry equipment. The multilayer film of EP 0 537 080 B, as previously mentioned, tears preferably perpendicular to the direction of extrusion. In certain cases, however, it is preferable to have omnidirectional tearability.

SUMMARY OF THE INVENTION

The thermoplastic shrinkable film of the present invention has omnidirectional tearability, good clarity and strength and is cost competitive with other films on the market. It consists of two or more layers, including, at least, (a) a layer of a polyolefin, (b) a layer of a blend of a polyolefin and an ionomer. Optionally, the film of the present invention contains (c) a further layer of a polyolefin. In the case layer (c) is present, layer (b) will be positioned between layers (a) and (c).

DETAILED DESCRIPTION OF THE INVENTION

Suitable polyolefins to be used in layers (a), (b) and (c) are known in the art. They may be homopolymers of α-olefins or copolymers of such olefins with one or more monomers, as well as mixtures thereof.

The α-olefin copolymer is a copolymer of α-olefins of the formula R'—CH=CH$_2$, wherein R' is hydrogen or an alkyl radical having 1 to 8 carbon atoms, with at least one further monoethylenically unsaturated monomers, such as aliphatic or aromatic monomers. Suitable such monoethylenically unsaturated monomers include vinyl acetate, styrene and (meth)acrylic derivatives. This other monomer can represent up to 20% by weight of the olefinic copolymer, preferably 1 to 10% by weight.

Suitable polyolefins for use in the invention include polyethylene, polypropylene, copolymers of ethylene and propylene, ethylene-vinyl acetate copolymers, copolymers of ethylene and acrylic derivatives, terpolymers based on olefin, methyl acrylate and ethyl acrylate, as well as mixtures of these. Preferred polyolefins are low density polyethylenes (LDPEs) and blends of LDPEs and high density polyethylenes (HDPEs), in a weight ratio of LDPE/HDPE in the range of 95/5 to 50/50.

Ionomers are known in the art. They are copolymers of ethylene and an α,β-unsaturated $C_3$–$C_8$ carboxylic acid, optionally containing at least one softening comonomer that is copolymerizable with ethylene. Acrylic and methacrylic acids are preferred acid comonomers. The softening comonomer can be an alkyl acrylate selected from the group consisting of n-propyl-, n-butyl-, n-octyl-, 2-ethylhexyl-, and 2-methoxyethyl-acrylates. The preferred alkyl acrylates are n-butyl-, 2-ethylhexyl-, and 2-methoxyethyl-acrylates. The softening comonomer can also be an alkyl vinyl ether selected from the group consisting of n-butyl-, n-hexyl-, 2-ethylhexyl-, and 2-methoxyethyl-vinyl ether. The preferred alkyl vinyl ethers are n-butyl vinyl ether and n-hexyl vinyl ether. The copolymer is about 10 to 100% neutralized with metal ions selected from groups Ia, Ib, IIa, IIIa, IVa, VIb, and VIII of the Periodic Table of Elements such as sodium, potassium zinc, calcium, magnesium, lithium, aluminum, nickel, and chromium. Typically, neutralization will be from 10–70%. Preferably the copolymer has from about 35 to about 70% of the carboxylic acid groups ionized by neutralization with metal ions selected from the group consisting of sodium, potassium, zinc, calcium, and magnesium. Ionomers and their methods of manufacture are described in U.S. Pat. No. 3,264,272. Suitable ionomers for use in the present invention are available from the DuPont Company, under the trademark SURLYN®.

The blend used to form layer (b) of the present invention will typically contain a weight ratio of ionomer/polyolefin in the range of 5/95 to 60/40, more preferably 10/90 to 30/70.

The total thickness of the film according to the present invention will typically be in the range of from 20 to 150 $\mu$m, preferably from 30 to 70 $\mu$m. The thickness of layers (a) and (c) will range, individually, from 1 to 30 $\mu$m, preferably from 3 to 10 $\mu$m. The thickness of layer (b) will range from 15 to 140 $\mu$m, preferably from 25 to 50 $\mu$m. A preferred embodiment of the present invention contains layers (a), (b) and (c). These constructions give the film particularly good clarity.

'Omni-directional tearability' means the film of the present invention can be torn by an end-user (e.g. purchaser of packaged bottled water) with relative ease in both the film's machine direction (MD) and transverse direction (TD). Tearability can be measured by the Elmendorf method, which is known in the art. Films of the present invention will have an Elmendorf tear strength in both the MD and TD ranging from 5 to 40 N/mm thickness of film (0.5 to 4 cN/$\mu$m), preferably from 10 to 20 N/mm (1 to 2 cN/$\mu$m).

The films of the present invention will also preferably demonstrate 'straight line' or near 'straight line' tear in the MD and TD. Straight line tear can be measured as follows:

Two 50 mm by 200 mm strips of sample films are prepared. In the first sample, the 200 mm length side runs in the MD; in the second sample, the 200 mm length side runs in the TD. A 30 mm cut is made in the center of one of the 50 mm ends of each sample, dividing the end into flaps. Each flap is placed in a jaw of an Instron or Zwick tensile testing machine. The jaws pull apart at a desired speed (e.g. 300 mm/min), thereby tearing an extension of the cut. Preferably, the tear will proceed through the middle of the strip, rather than off to one side.

The polyolefin(s) and ionomer are co-extruded under particular conditions that yield the films according to the present invention. Upon discharge from the die, the film is cooled on a cylinder that is rotating at a speed higher than that of the film discharge rate. This gives the film longitudinal orientation. At the outlet of the flat die, it is also possible to give the film flat bi-axial stretching, using known techniques.

The conditions under which blown co-extrusion is carried out are as follows. Extruder temperature for the ionomer is in the range of 170 to 220° C., preferably 180 to 200° C. Extruder temperature for the polyolefin is in the range of 160 to 240° C., preferably 180 to 220° C. The temperature of the extrusion die is in the range of 180 to 220° C., preferably 190 to 210° C. The blow-up ratio is in the range of 2 to 5, preferably 2.5 to 3. The blow-up ratio is defined as bubble diameter/die head diameter.

The winding speed is in the range of 5 to 60 m/min, preferably 20 to 30. The extrusion gap is in the range of 0.5 to 3 mm, preferably 1 to 2.

The film of the present invention may contain additional features to make it particularly suitable for packaging applications. One such feature is a tab formed in the film to facilitate initiation of a tear. One such type of tab is described in EP 0 537 079 B1.

EXAMPLE

A three-layer film having a total thickness of 60 μm is formed as follows:

| Material | Source |
|---|---|
| LDPE. | LUPOLENE 3020 available from BASF |
| Ionomer. | SURLYN 1601 available from DuPont |
| Layer (a): | LDPE, 10 μm thickness; |
| Layer (b): | 85% LDPE/15% by weight ionomer blend, 40 μm thickness; |
| Layer (c): | LDPE, 10 μm thickness |

The ionomer extruder is maintained at a temperature of 190° C. and the LDPE extruder at a temperature of 200° C. The extrusion die temperature is 200° C. The extrusion die gap is set at 1.5 mm. The blow-up ratio is 2.8 and winding speed of the co-extruded film is 30 m/min.

Under conventional bundling conditions, a variety of objects such as bottled mineral water are packaged using this film. After initiating a tear in the desired direction, it is possible to continue the tear in that direction without exercising any particular force. Before the tear is initiated, the film maintains all of its shrink and tear resistance properties necessary during the various handling of the bundle.

What is claimed is:

1. A multilayer thermoplastic film adapted for packaging comprising
   (a) a layer of a polyolefin and
   (b) a layer of a blend of a polyolefin and an ionomer, wherein the weight ratio of ionomer/polyolefin is from 10/90 to 30/90 and demonstrating omni-directional tearability, wherein the Elmendorf tear strength in both the MD and TD range from 1 to 2 cN/μm.
2. A film according to claim 1 further comprising
   (c) a further layer of a polyolefin, wherein layer (b) is positioned between layers (a) and (c).
3. A film according to claim 1 or 2, wherein the polyolefin is polyethylene.
4. A film according to claim 3 wherein the polyolefin is low density polyethylene.

* * * * *